United States Patent
Warren et al.

[11] Patent Number: 5,618,060
[45] Date of Patent: Apr. 8, 1997

[54] HINGE COVER

[76] Inventors: Gary Warren, 118 Tudor Rd., Centereach, N.Y. 11720; Ralph Matera, 43 9th St., Lake Ronkonkoma, N.Y. 11779

[21] Appl. No.: 429,425

[22] Filed: Apr. 25, 1995

[51] Int. Cl.[6] .................................................. B62D 25/16
[52] U.S. Cl. ................................... 280/848; 16/250
[58] Field of Search ............................... 280/848, 152.3, 280/154, 152.1, 852; 16/250, 251; 29/11; 296/146.11

[56] References Cited

U.S. PATENT DOCUMENTS

| D. 249,913 | 1/1977 | Petty | D12/186 |
|---|---|---|---|
| D. 252,081 | 6/1979 | Melby | D12/186 |
| D. 293,312 | 12/1987 | Stahel | D12/186 |
| D. 318,642 | 7/1991 | Gaither | D12/167 |
| 4,697,842 | 10/1987 | Kawasaki | 16/250 |
| 5,490,306 | 2/1996 | Floyd et al. | 16/250 |

Primary Examiner—Richard M. Camby
Assistant Examiner—Frank Vanaman
Attorney, Agent, or Firm—Goldstein & Associates

[57] ABSTRACT

The invention is a fender hinge cover for covering the damaged area which typically surrounds a motorcycle fender hinge. The fender hinge cover comprises a shell having a notched recess and bores which are threaded. Locking screws, threaded to correspond to the thread of the bores, are located within said bores. The shell is placed over the hinge and hinge pin of a motorcycle fender and the locking screws are turned within the bores so that they travel towards and contact the hinge pin, thus locking the hinge within the notched recess of the shell. Accordingly, the fender hinge cover is secured to the hinge and thus fender of the motorcycle, and conceals any damage to the finish of the fender which may immediately surround the hinge.

7 Claims, 2 Drawing Sheets

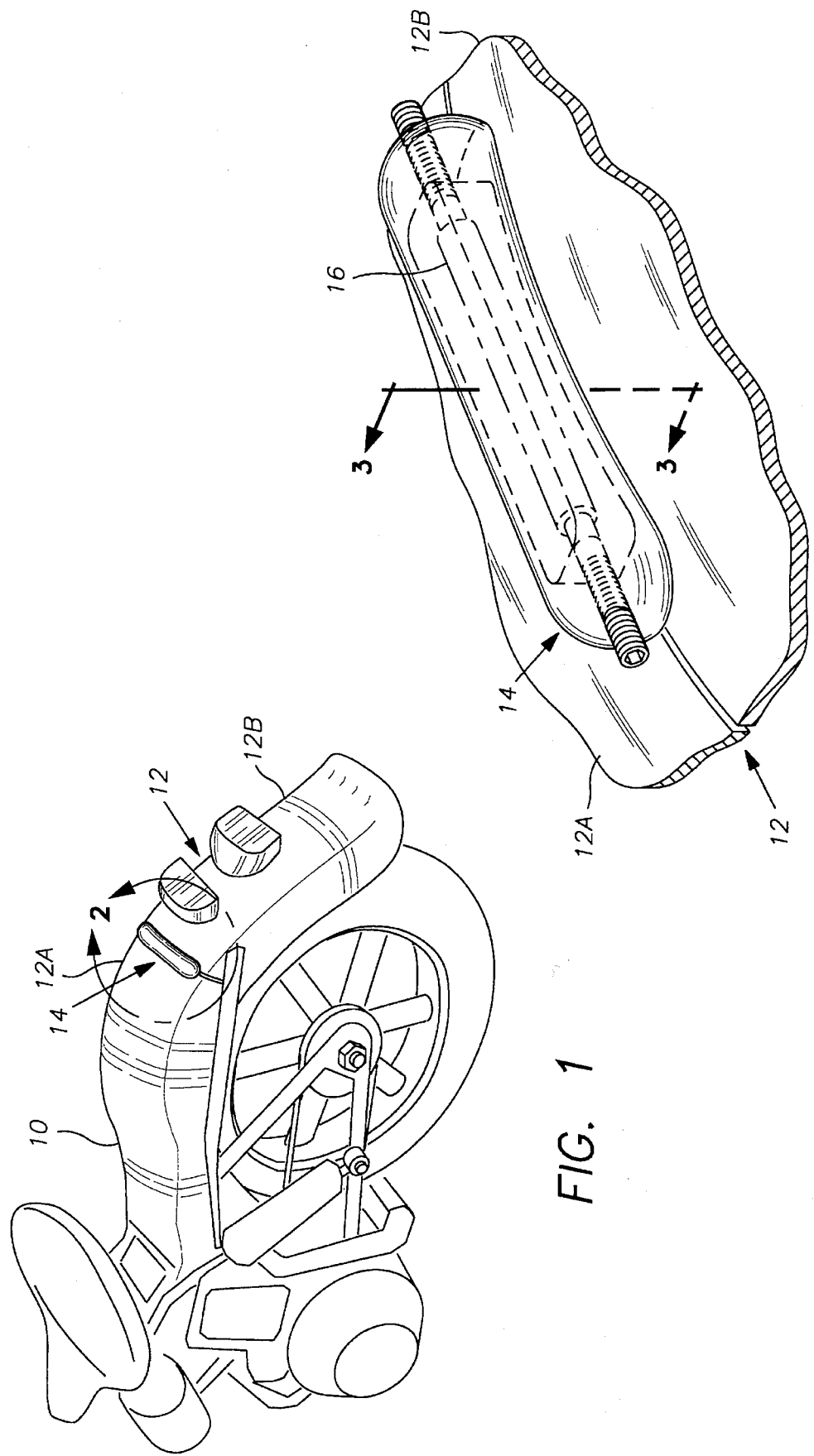

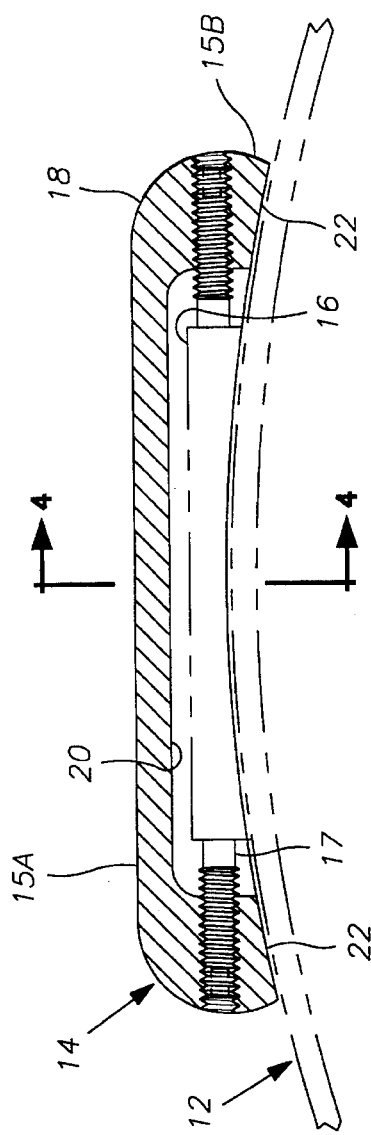
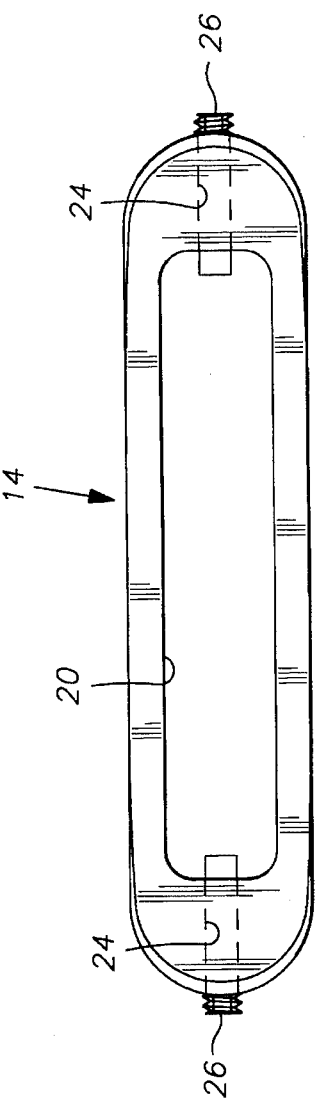
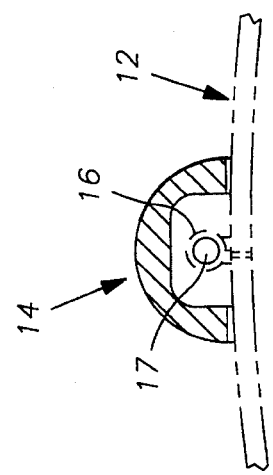

HINGE COVER

BACKGROUND OF THE INVENTION

The invention relates to a hinge cover for a motorcycle fender hinge. More particularly, the invention relates to a fender hinge cover aimed at concealing the hinge of a motorcycle fender and the finished area of the fender which surrounds the hinge and secures the hinge pin from vibrating out of the hinge.

Many motorcycles, namely the Harley Davidson model years 1958 to 1984, possess a rear fender assembly which is divided at its mid-section into two portions—an upper fender and a lower fender. A hinge is located at the mid-section, connecting the upper fender and the lower fender. The purpose of such hinge, and of such two-part fender, is to allow a person who may be performing maintenance on the motorcycle easy access to certain typically inaccessible regions of the vehicle by simply lifting the lower fender. Once the lower fender is lifted, access can be had to the normally concealed sections of the motorcycle such as portions of the chassis, the underside of the motorcycle seat, etc.

Upon lifting the lower fender and raising it towards the upper fender, the two portions of the rear fender are caused to abut and chafe each other at the hinge area, thus causing damage to any finish which may have been applied to the rear fender, especially in the area immediately surrounding the hinge. Since many motorcycle enthusiasts apply custom finishes to their motorcycles such as metal flake paints, pearlescent paints and detailed pinstripes and murals, it becomes highly impractical and expensive to properly repair the damaged finish to its original condition. Accordingly, the more practical solution is to simply conceal the area surrounding the hinge where the finish has been damaged. The optimal solution would be to conceal the hinge and surrounding area with a device which is easily installable, yet does not detract from the overall appearance of the motorcycle but rather complements the overall appearance.

While various related references in the art focus on decorative motorcycle fenders, fender extensions, fairings and the like, none seem to attempt to conceal damage to the finish which surrounds the hinge area of a motorcycle having a hingeable fender. While these units may be suitable for the particular purpose employed, or for general use, they would not be as suitable for the purposes of the present invention as disclosed hereafter.

SUMMARY OF THE INVENTION

It is an object of the invention to produce a motorcycle fender hinge cover.

It is another object of the invention to produce a motorcycle fender hinge cover which, upon installation, conceals the motorcycle fender hinge and the finished area of the fender which immediately surrounds the hinge.

It is a still further object of the invention to conceal the area on the motorcycle fender surrounding said hinge, since the finish on such surrounding area is prone to chipping, scratching and marring when the lower fender is lifted up about the hinge to perform routine maintenance thereabout.

It is yet another object of the invention to produce a motorcycle fender hinge cover which can be quickly and effortlessly installed upon a motorcycle without the need to make any structural changes to the motorcycle.

The invention is a fender hinge cover for covering the damaged area which typically surrounds a motorcycle fender hinge. The fender hinge cover comprises a shell having a notched recess and bores which are threaded. Locking screws, threaded to correspond to the thread of the bores, are located within said bores. The shell is placed over the hinge and hinge pin of a motorcycle fender and the locking screws are turned within the bores so that they travel towards and contact the hinge pin, thus locking the hinge within the notched recess of the shell. Accordingly, the fender hinge cover is secured to the hinge and thus fender of the motorcycle, and conceals any damage to the finish of the fender which may immediately surround the hinge.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 1 is a perspective view of the instant invention installed on a typical motorcycle fender.

FIG. 2 is an enlarged view of the instant invention installed on a typical motorcycle fender, as was illustrated in FIG. 1.

FIG. 3 is a cross sectional view with parts broken away of the instant invention, taken on line 3—3 of FIG. 2.

FIG. 4 is a cross sectional view of the instant invention taken on line 4—4 of FIG. 3.

FIG. 5 is a plan view of the instant invention.

DETAILED DESCRIPTION OF THE PREFERRED EMBODIMENTS

FIG. 1 illustrates a motorcycle 10, having a hingeable fender 12. The instant invention, a fender hinge cover 14, is shown installed thereon. The hingeable fender 12 of said motorcycle 10 comprises an upper fender 12A and a lower fender 12B. The upper fender 12A and the lower fender 12B are connected by a hinge 16, which can be seen best by referring to FIG. 2. By referring to FIG. 4, it can be seen that the hinge 16 further comprises a hinge pin 17, said hinge pin 17 extending through the center of the hinge 16.

Typically, when the fender hinge cover 14 is not installed upon the motorcycle 10, the lower fender 12B may be lifted up towards the upper fender 12A in an attempt to gain easier access to components located beneath the fender 12 to perform routine maintenance. As a result, the finish on the area surrounding the hinge 16 is usually scratched or marred due to the lower fender 12B and upper fender 12A abutting or chafing each other.

As illustrated in FIG. 3, the fender hinge cover 14 comprises a shell 18, which is substantially oval in shape. The shell 18 has a top 15A, and a bottom 15B. A notched recess 20 located on its bottom 15B of the shell 18, said notched recess 20 of sufficient depth so that the shell 18 may completely enclose the hinge 16. The shell 18 also has a lower edge 22 located on the bottom 15B. The lower edge 22 has a concave curvature along its length, so that the lower edge 22 and the fender 12, which has a convex curvature, fit tightly against each other. When the fender hinge cover 14 is installed upon the fender 12, the hinge 16 is contained fully within the notched recess 20, and the lower edge 22 of the shell 18 rests snugly against the fender 12. An optional gasket may be installed between the lower edge 22 of the shell 18 and the fender 12 if desired. Also, additional hinge pins 17 of different lengths may be substituted for the original hinge pin 17 in the event that the fender hinge cover 14 does not fit over the existing hinge pin 17.

Accordingly, once the fender hinge cover 14 is installed, the hinge 16 is completely hidden from view, and the area of the fender 12 which immediately surrounds the hinge 16 is also hidden from view. As a result, any damage to the finish of the fender 12 which immediately surrounds the hinge 16 is concealed. Reference to FIG. 4 further illustrates how the fender hinge cover 14, once installed upon the fender 12, completely encloses the hinge 16.

FIG. 5 illustrates a pair of bores 24 which extend through the ends of the shell 18 and into the notched recess 20. A pair of locking screws 26 have threads which correspond to threads located within the bores 24, and each locking screws 26 is located within one of the bores 24. When the fender hinge cover 14 is placed over the hinge 16 on the fender 12, the locking screws 26 are turned so that they travel towards the hinge pin 17 which was depicted in FIGS. 3 and 4, until the locking screws 26 contact the ends of the hinge pin 17, as seen by referring back to FIG. 3. The locking screws 26 can have recessed allen key fittings, standard slotted or phillips screw fittings, nut fittings or the like to provide a means for turning the locking screws 26 within the bores 24 until they contact the hinge pin 17.

Accordingly, once the locking screws 26 are caused to contact the hinge pin 17, the hinge pin 17 and hinge 16 is pinched between the locking screws 26 within the notched recess 20, and thus the fender hinge cover 14 is firmly secured to the hinge 16 and fender 12. It should be noted that while the fender hinge cover 14 effectively conceals the hinge 16 and the area of the fender 12 immediately surrounding the hinge 16, it does nevertheless prevent the lower fender 12B from being lifted in the normal fashion. If the lower fender 12B is to be lifted, the fender hinge cover 14 must be removed from the motorcycle 10.

What is claimed is:

1. A fender hinge cover, for concealing a hinge located on a fender of a motorcycle and the damaged area of the fender which typically surrounds the hinge, comprising:
   a) a rigid shell, the shell having substantially the shape of an elongated oval, said shell having a top, a bottom, and a length; and
   b) a notched recess located at the bottom of said shell, the notched recess extending in the direction of the length of the shell, such that said shell may be placed over the hinge, with the hinge enclosed within the notched recess so that the hinge and area surrounding it are concealed by the fender hinge cover.

2. The hinge cover as recited in claim 1, wherein the shell further has a lower edge located on the bottom, said lower edge having a concave curvature along its length.

3. The hinge cover as recited in claim 2, wherein the notched recess is of a depth which is greater than the height of the hinge, thus permitting the hinge to be completely enclosed within the notched recess when the fender hinge cover is installed upon the fender.

4. The hinge cover as recited in claim 3, wherein the shell has a bore located each end, said bore extending through the shell and into the notched recess, a locking screw located within each bore.

5. The hinge cover as recited in claim 4, wherein the bores are threaded and the locking screws are threaded, the threads of the bores matching the threads of the locking screws, such that the locking screws may be turned within the bores and thus incrementally advanced towards or withdrawn from the notched recess.

6. A method for concealing a hinge and hinge pin on a fender of a motorcycle and the area of the fender surrounding the hinge, wherein a fender hinge cover comprises a shell having a top and a bottom, a lower edge having a concave curvature along its length located at said bottom, a notched recess also located at said bottom, bores extending through the ends of the shell into the notched recess, and a locking screw located within each bore, the locking screws having threads which correspond to threads of the bores, comprising the steps of:
   a) turning the locking screws within the bores so that the locking screws withdraw from the notched recess;
   b) placing the shell upon the hinge and fender such that the hinge is enclosed within the notched recess, and the lower edge of the shell rests firmly against the fender; and
   c) turning the locking screws within the bores so that the locking screws advance towards the notched recess and the hinge which is located therein, until the locking screws press firmly against the hinge pin of the hinge, thus securely fastening the fender hinge cover to the fender and completely concealing the hinge and area surrounding it.

7. A method for concealing a hinge and hinge pin on a fender of a motorcycle and the area of the fender surrounding the hinge, wherein a fender hinge cover comprises a shell having a top and a bottom, a lower edge having a concave curvature along its length located at said bottom, a notched recess also located at said bottom, bores extending through the ends of the shell into the notched recess, and a locking screw located within each bore, the locking screws having threads which correspond to threads of the bores, comprising the steps of:
   a) removing the existing hinge pin from the hinge and replacing it with a substitute hinge pin;
   b) turning the locking screws within the bores so that the locking screws withdraw from the notched recess and do not protrude into it;
   c) placing the shell upon the hinge and fender such that the hinge is enclosed within the notched recess, and the lower edge of the shell rests firmly against the fender; and
   d) turning the locking screws within the bores so that the locking screws advance towards the notched recess and the hinge which is located therein, until the locking screws press firmly against the hinge pin of the hinge, thus securely fastening the fender hinge cover to the fender and completely concealing the hinge and area surrounding it.

* * * * *